United States Patent
Kirchmeier et al.

(10) Patent No.: US 8,653,405 B2
(45) Date of Patent: Feb. 18, 2014

(54) METHOD FOR OPERATING A VACUUM PLASMA PROCESS SYSTEM

(75) Inventors: Thomas Kirchmeier, Teningen (DE); Michael Glück, Freiburg (DE); Christoph Hofstetter, Teningen (DE); Gerd Hintz, Pfaffenweiler (DE)

(73) Assignee: HUETTINGER Elektronik GmbH + Co. KG, Freiburg (DE)

( * ) Notice: Subject to any disclaimer, the term of this patent is extended or adjusted under 35 U.S.C. 154(b) by 935 days.

(21) Appl. No.: 11/559,102

(22) Filed: Nov. 13, 2006

(65) Prior Publication Data

US 2008/0041830 A1      Feb. 21, 2008

(30) Foreign Application Priority Data

Nov. 12, 2005   (EP) ..................................... 05024772

(51) Int. Cl.
    *H01L 21/306*      (2006.01)
(52) U.S. Cl.
    USPC ............ 219/121.57; 219/121.36; 156/345.48; 156/345.35; 156/345.38; 372/55
(58) Field of Classification Search
    USPC ........................... 219/121.57, 121.36; 372/55
    See application file for complete search history.

(56) References Cited

U.S. PATENT DOCUMENTS

| | | | |
|---|---|---|---|
| 4,637,030 A | | 1/1987 | Midavaine et al. |
| 4,885,754 A | | 12/1989 | Egawa |
| 4,887,272 A | * | 12/1989 | Karube et al. ............. 372/38.01 |
| 5,434,881 A | | 7/1995 | Welsch et al. |
| 6,539,045 B1 | | 3/2003 | Von Borstel et al. |
| 6,740,842 B2 | * | 5/2004 | Johnson et al. .......... 219/121.54 |
| 2002/0130110 A1 | * | 9/2002 | Kwon et al. ............. 219/121.54 |
| 2005/0115933 A1 | * | 6/2005 | Kong et al. .............. 219/121.57 |

FOREIGN PATENT DOCUMENTS

| | | |
|---|---|---|
| EP | 0 313 664 | 5/1989 |
| EP | 0 315 696 | 5/1989 |
| JP | 63228681 | 9/1988 |
| JP | 64022081 | 1/1989 |

OTHER PUBLICATIONS

European Search Report for European Application No. 05024772.5 mailed Sep. 15, 2006.
Niimi et al., "Development and Characterization of a Low Current Capillary Discharge for X-ray Laser Studies", IEEE Transaction on Plasma Physics, USA, Apr. 2002, vol. 30, No. 2, pp. 616-621.
English translation of Japanese Office Action from corresponding Japanese Patent Application No. 2006-305828, mailed Jul. 29, 2009, 10 pages.

* cited by examiner

*Primary Examiner* — Brian Jennison
(74) *Attorney, Agent, or Firm* — Fish & Richardson P.C.

(57) ABSTRACT

In one aspect, operating a vacuum plasma process system including a plasma discharge chamber is accomplished by generating a main plasma in the discharge chamber in a first operating state, and generating an auxiliary plasma in the discharge chamber in a second operating state. Generating the main plasma includes generating a main plasma power with a first number of RF power generators, and generating an auxiliary plasma power with a second number of RF power generators, such that the second number is smaller than the first number.

25 Claims, 2 Drawing Sheets

METHOD FOR OPERATING A VACUUM PLASMA PROCESS SYSTEM

CROSS REFERENCE TO RELATED APPLICATION

This application claims priority under 35 U.S.C. §119(a) to European Application No. 05 024 772.5 filed on Nov. 12, 2005, the entire contents of which are hereby incorporated by reference.

TECHNICAL FIELD

The invention concerns methods for operating vacuum plasma process systems.

BACKGROUND

Gas lasers are excited by plasma that is generated in so-called discharge chambers. The plasma can be generated by RF energy, e.g., at 13 MHz or 27 MHz.

At present, the overall RF power that is required for operating a $CO_2$ laser is generated by a single RF power generator and guided into the discharge chamber, where it is divided onto individual discharge paths. Such a system is described, e.g., in U.S. Pat. No. 6,539,045. Uniform distribution of the RF power is very complex and depends substantially on the mechanical and geometrical conditions of the discharge chamber and the discharge paths. Variable excitation of individual discharge paths can be possible using complex switches.

$CO_2$ lasers are often operated in a pulsed manner at frequencies between 10 Hz and 200 KHz. A gas laser is switched on and off at very short intervals if it is used, e.g., for cutting sheet metal. The plasma for generating the laser is re-ignited during pulsing and also for each turn-on or ignition. During ignition very high voltages are used and the plasma load has a very high impedance. Both factors can cause the RF power generator to be heavily loaded. The impedance drops very quickly to very low values after ignition, that is, during full power, and the load is adjusted for operation during full power. For this reason, the major part of the power is reflected by the plasma load during ignition.

In order to facilitate ignition, an ignition aid is frequently provided in the discharge chambers, as is disclosed in U.S. Pat. No. 5,434,881, which provides an excess field substantially due to its mechanical structure, thereby producing locally limited plasma discharge even at low powers. This locally limited plasma discharge produces a sufficient amount of electrons and ions, such that the plasma quickly spreads in the whole discharge chamber when additional power is supplied.

However, these ignition aids produce undesired inhomogeneities during operation at full power, and these inhomogeneities can produce sparkovers at high powers.

In some ignition aids, an additional generator applies a particularly high voltage to a separate electrode pair at the time of ignition. Such ignition aids can be more expensive and can include additional components.

SUMMARY

In one general aspect, the invention features methods for operating a vacuum plasma process system by generating a main plasma in a first operating state of the vacuum plasma process system, and generating an auxiliary plasma in a second operating state of the vacuum plasma process system. A main plasma power is generated with a first number of RF power generators, and an auxiliary plasma power is generated with a second number of RF power generators to generate the main plasma. The second number is smaller than the first number.

The operating state of the vacuum plasma process system is the state in which the plasma process system is operating at a particular power level. Thus, in a first operating state, the vacuum plasma process system operates at a first power level and in a second operating state, the vacuum plasma process system operates at a second power level.

Implementations can include one or more of the following features. For example, each RF power generator can be associated with an electrode or an electrode pair. All RF power generators can be used to generate the main plasma.

The methods can include monitoring the state of the plasma. The plasma state can be monitored by determining whether an auxiliary plasma or no plasma is present.

The main plasma can be generated by driving the RF power generators based on whether or not an auxiliary plasma is present.

The method can include predetermining an RF power below which the auxiliary plasma extinguishes. The method can include detecting and storing an RF power at which the plasma extinguishes. The methods can include controlling the generated power in a closed-loop manner.

The methods can include driving the RF power generators. The RF power generators can be driven in parallel with a central control.

In another general aspect, the invention features vacuum plasma process systems that include a discharge chamber, and RF power generators for generating a main plasma in a first operating state and an auxiliary plasma in a second operating state. Several of the RF power generators are provided having associated electrodes or electrode pairs. A first number of RF power generators are operated for generating the main plasma, and a second number of RF power generators are operated to generate the auxiliary plasma. The second number is smaller than the first number.

Implementations can include one or more of the following features. For example, each RF power generator can be associated with an electrode or an electrode pair.

The vacuum plasma process systems can include a control coupled to the RF power generators to drive the RF power generators. The vacuum plasma process system can include a plasma detecting means connected to the control and coupled to the discharge chamber.

The vacuum plasma process systems can include a plasma detecting means coupled to the discharge chamber. The plasma detecting means can be designed, e.g., as a Langmuir probe, a capacitive sensor, an optical sensor, or a thermal sensor. The plasma detecting means can also be designed as one or more measuring means for electric variables, power variables, or both electric and power variables.

The vacuum plasma process systems can include impedance matching members that connect the RF power generators to the electrodes or electrode pairs. The vacuum plasma process systems can include a storage means that stores a plasma power value, below which the auxiliary plasma extinguishes.

In another general aspect, a first number of RF power generators generate a main plasma power and a second number of RF power generators generate an auxiliary plasma power to generate the main plasma. The second number is smaller than the first number. In this way, the main plasma can be operated at a predetermined power value by the power generated by the RF power generators. When the main plasma has been switched off or has been extinguished, e.g., in a pulse pause, at least some of the RF power generators are operated at a very low power, which is just sufficient to maintain one plasma discharge, i.e., the auxiliary plasma, with which the plasma power can be quickly brought back to the predetermined value of the main plasma without having to use a mechanical ignition aid. For this reason, separate electrodes that merely serve to maintain the auxiliary plasma can be omitted. The electrodes and the RF power generators used for the auxiliary plasma are also used for the main plasma.

In some implementations, each RF power generator can be associated with an electrode or an electrode pair, and all RF power generators can be used to generate the main plasma. Conventional RF power generators for cutting and welding lasers are typically operated at 13 or 27 MHz and have output powers of 10 or 150 kW. Several RF power generators are used, and each individual RF power generator produces less power to obtain the same overall power. This design permits use of RF power generators constructed from semi-conductor devices, rather than from amplifier tubes. For this reason, one RF power generator can be provided for each electrode pair.

In some implementations, the plasma state is monitored, in particular, to detect whether an auxiliary plasma or no plasma is present. When the plasma state has been detected, the corresponding information can be used for further operation of the vacuum plasma system.

The RF power generators can be driven, in particular, based on whether or not an auxiliary plasma is present, for igniting the main plasma. When it is detected that no auxiliary plasma is left, the RF power generators can be driven to perform a "hard ignition" in which they provide a high voltage because a plasma must initially be generated in the discharge chamber. The high voltage can alternatively be generated by changing the load matching to "hard ignition" or changing the RF power frequency. A high voltage is a voltage that is substantially higher than the voltage at which the RF power generators operate during normal operation and its value depends on the power and plasma applications for the RF power generator. For example, high voltage can be 10% higher than the voltage at which the RF power generators operate during normal operation. However, if it is detected that auxiliary plasma is still present in the discharge chamber, a "soft ignition" can be used in which the RF power generators provide a low voltage. A low voltage is a voltage that is less than high voltage, for example, less than about 10% higher than the voltage at which the RF power generators operate during normal operation. Thus, the value of the low voltage also depends on the power and plasma applications for the RF power generator.

The main plasma power can, in particular, be obtained by fast (closed-loop) power control by a central control, thereby preventing overswinging of the RF power beyond a desired power.

If an RF power is predetermined, below which the auxiliary plasma extinguishes, the auxiliary plasma can be prevented from being extinguished through correspondingly driving at least the second number of RF power generators. This RF power depends to a large extent on the vacuum plasma process to be used. If the process and the RF power required for the auxiliary plasma of this process are known, the RF power can, e.g., be manually preset.

The RF power, at which the RF plasma extinguishes, can alternatively be detected and stored. If, e.g., a new vacuum plasma process is run and the RF power at which the auxiliary plasma extinguishes is not known, the power value at which the auxiliary plasma extinguished during initial operation may be stored. By storing this value, future extinguishing of the auxiliary plasma can be prevented by correspondingly driving the RF power generators.

In some implementations, the power is closed-loop controlled such that the plasma process can be performed with high precision.

In another general aspect, a vacuum plasma process system, in particular, a laser system or a coating system, includes a discharge chamber and at least one RF power generator for generating a main plasma in a first operating state and for generating an auxiliary plasma in a second operating state. Several RF power generators having associated electrodes or electrode pairs are provided, and a first number of RF power generators are operated to generate the main plasma and a second number of RF power generators are operated to generate the auxiliary plasma. The second number is smaller than the first number. This arrangement does not require any separate, in particular, mechanical ignition aid. The RF power generators and the electrodes associated therewith can be used both for generating a main plasma and an auxiliary plasma such that ignition of the main plasma starting from an auxiliary plasma is facilitated and accelerated.

In some implementations, each RF power generator is associated with an electrode or an electrode pair. This configuration cuts down on the number of circuits required for distributing the RF power of one single RF power generator to several electrodes. The power supply into the plasma process through the individual electrodes can thereby be open-loop and closed-loop controlled more precisely.

In some implementations, the RF power generators can be driven in parallel by one common central control. This design provides the user with better or maximum control of the vacuum plasma process that can be performed with high precision, because even the slightest changes can be responded to with precision.

In other implementations, a plasma detecting means is provided and the plasma detecting means, as described herein, is connected, in particular, to the central control The plasma detecting means can, e.g., detect whether a main plasma, an auxiliary plasma, or no plasma at all is present in the discharge chamber. It is helpful to detect whether auxiliary plasma is present because the presence of auxiliary plasma facilitates ignition of the main plasma if using a smaller RF power (for example, 10 W to 1 kW) and lower voltages. If no plasma is present, the ignition process can take longer, requiring larger powers (for example, 1 kW to 200 kW) and voltages. If it has been detected that no plasma is present, an amount of RF power that is sufficient for igniting the main plasma can be provided.

The plasma detecting means can be embodied in different ways. A Langmuir probe, a capacitive sensor, an optical sensor, or a thermal sensor are particularly suited as a plasma detecting means. These sensors can be disposed in or on the discharge chamber.

The plasma detecting means can also be designed as one or several measuring means for electric variables and/or power variables. Electric variables such as current and/or voltage can, e.g., be measured at the output of the RF power generator(s) or at the electrodes. Electric variables can furthermore be measured in the feed lines to the electrodes or in optionally provided adjustment members or coupling members. The power supplied to the plasma process or the power reflected by the plasma process can additionally be measured. The harmonics of the current and/or the voltage can be measured or detected to obtain information about the plasma state. Information about the presence of an auxiliary plasma can be obtained from a measurement of the phase difference between the current and the voltage or from the time behavior of a variable, such as, e.g., the voltage or the current.

The power reflected by the plasma process can be minimized by connecting the RF power generators to the electrodes through impedance matching members.

In some implementations, a storage means is provided for storing a plasma power value below which the auxiliary plasma is extinguished. Consequently, this value need not be repeatedly input and moreover, the power for the auxiliary plasma can always be optimally adjusted when the main plasma is switched off.

The method and the system are particularly suited for laser systems, in which the auxiliary plasma has little disturbing effect because a laser beam only forms when a certain minimum power has been released in the vacuum plasma process.

Further advantages will emerge from the description and the drawings. It is equally possible to use the features mentioned herein by themselves or in a plurality in any desired combinations. The embodiments that are shown and described are not to be understood as a definitive list, being rather of an exemplary nature for describing the invention.

DETAILED DESCRIPTION

Figure 1:
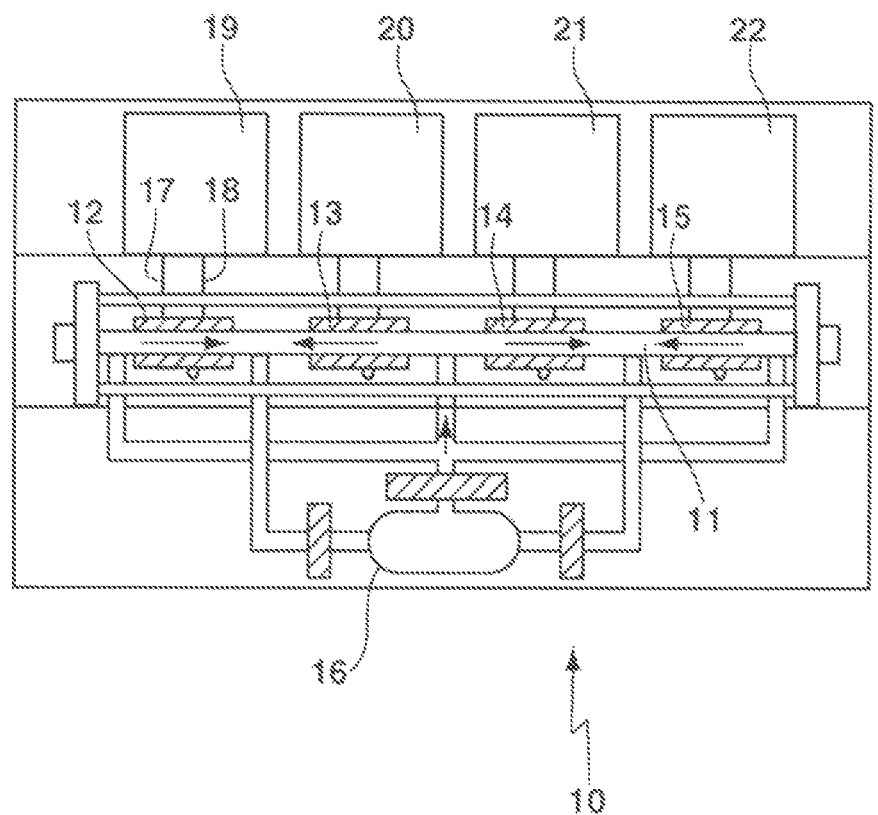
FIG. 1 is a schematic diagram of a vacuum plasma process system including a discharge chamber.

FIG. 1 shows a vacuum plasma process system 10 for a gas laser. The system 10 includes a discharge chamber 11 and four electrode pairs 12, 13, 14, 15 disposed on the discharge chamber 11. Gas is pumped with a pump system 16 into the discharge chamber 11. The electrode pair 12 is connected to an RF power generator 19 through feed lines 17, 18. Additionally, the electrode pairs, 13, 14, 15 are connected to RF power generators 20, 21, 22. In order to generate a main plasma or a plasma process in the discharge chamber 11, the RF power generators 19 to 22 are usually driven to couple a maximum RF power through the associated electrodes or through the electrode pairs 12 to 15 into the discharge chamber 11.

The main plasma is ignited or generated with a large RF power and large voltages. When the main plasma is not required, e.g., if the laser is temporarily not used, or in pulse pauses during pulsed operation of the laser, the power supply through some of the RF power generators 19 to 22, e.g., the RF power generators 19 to 21, is interrupted, e.g., by switching off the RF power generators 19 to 21. In this case, the RF power generator 22 still supplies a sufficient amount of RF power through the associated electrode pair 15, such that an auxiliary plasma remains in the area of the electrode pair 15 in the discharge chamber 11.

When subsequently main plasma is required again, only the RF power generators that were previously interrupted, i.e., the RF generators 19 to 21 need be connected, and the main plasma is ignited with a relatively low RF power and voltage supply because auxiliary plasma is present in the discharge chamber 11.

Figure 2:
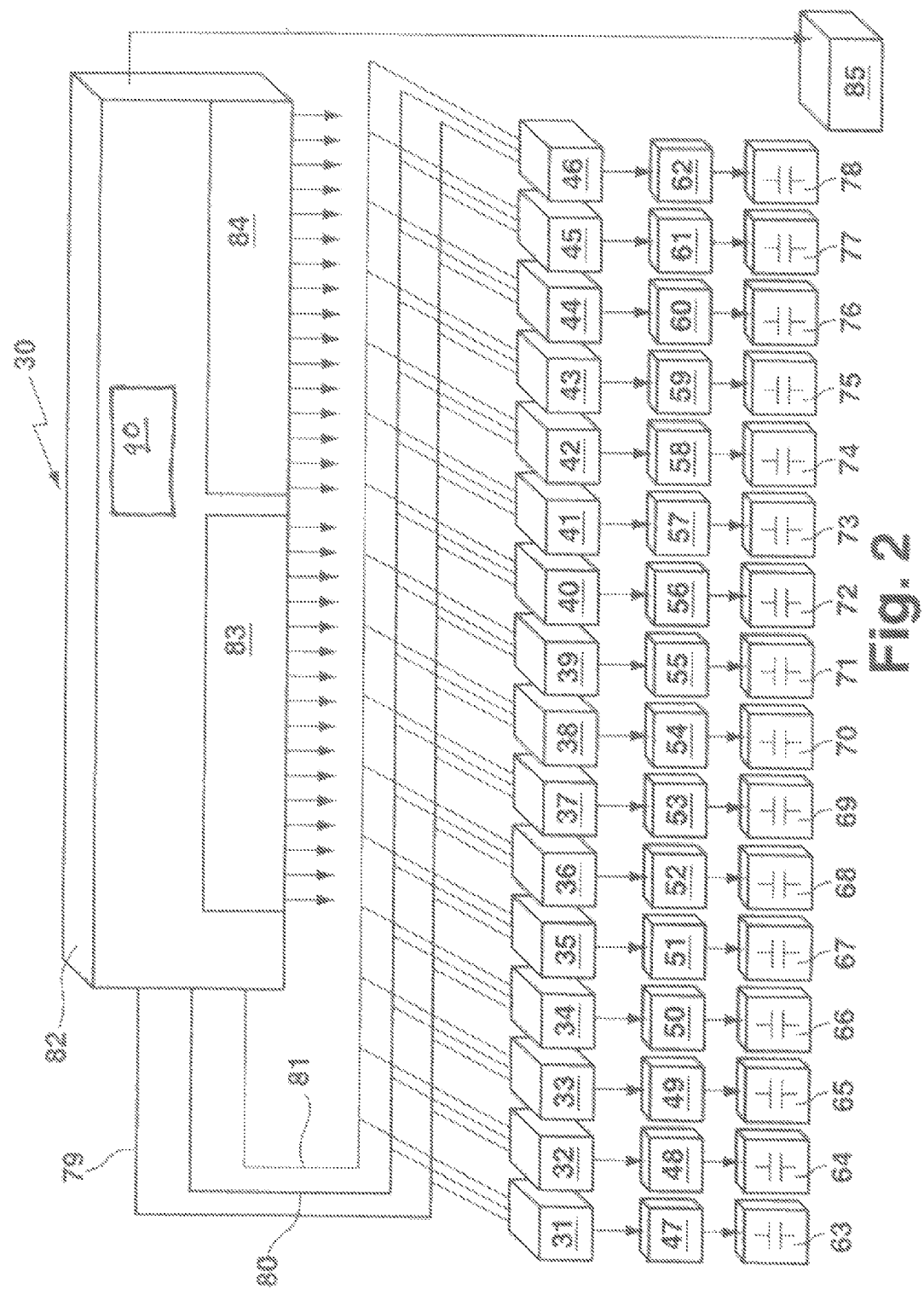
FIG. 2 is a schematic diagram of a vacuum plasma process system including control.

FIG. 2 shows a vacuum plasma process system 30 that includes sixteen RF power generators 31 to 46 that are each connected to an electrode pair 63 to 78 through an impedance matching member 47 to 62, which can reduce the power reflected by the plasma process. Each of the electrode pairs 63 to 78 are disposed on a discharge chamber such as the one shown in FIG. 1. The RF power generators 31 to 46 are connected to a central control 82 through analog signal lines 79, an interface 80, and an error message line 81. The central control 82 produces sixteen synchronous pulse outputs 83 and sixteen synchronous cycle outputs 84 that are also guided to the RF power generators 31 to 46. The RF power generators 31 to 46 are driven by the central control 82, which provides multiple possibilities of influencing the vacuum plasma process. It is also possible to drive all or only some of the RF power generators 31 to 46. In some implementations, all RF power generators 31 to 46 are used to feed a main plasma. In other implementations, depending on the vacuum plasma process, less than all of the RF power generators 31 to 46 are used for feeding a main plasma. In any vacuum plasma process, the number of RF power generators 31 to 46 that are used for feeding the main plasma is larger than the number of RF power generators 31 to 46 that are used to feed the auxiliary plasma. In some implementations, only one RF power generator 31 to 46 is used to feed the auxiliary plasma.

If the RF power generators 31 to 46 are not used to generate a main plasma, then an auxiliary plasma can be generated in the discharge chamber.

A plasma detecting means 85 is coupled to the discharge chamber. The plasma detecting means 85 can detect the operating state of the plasma in the discharge chamber, that is, whether a main plasma, an auxiliary plasma, or no plasma at all is present in the discharge chamber. In some implementations, the plasma detecting means 85 is provided to verify the presence of auxiliary plasma in the discharge chamber because the presence of an auxiliary plasma facilitates ignition of the main plasma using a lower RF power and lower voltages. If no plasma is present, the ignition process takes longer, requiring higher powers and voltages. If the plasma detecting means 85 detects that no plasma is present, an amount of RF power that is sufficient for igniting the main plasma is provided.

The plasma detecting means 85 is connected to the control 82 for data exchange therewith. The measured values detected by the plasma detecting means 85 can be evaluated directly by the plasma detecting means 85 or by the central control 82. The central control 82 can control the power supply of the RF power generators 31 to 46, which maintain the auxiliary plasma, in a closed-loop manner on the basis of information provided by the plasma detecting means 85. In other implementations, the central control 82 can control the power supply of the RF power generators 31-46 in an open-loop manner without the information provided by the plasma detecting means 85.

The central control 82 can also drive the RF power generators 31 to 46 in different ways to ignite a main plasma, based on whether the plasma detecting means 85 signals that an auxiliary plasma is present in the discharge chamber or that no plasma is present.

The plasma detecting means 85 can be, e.g., a Langmuir probe, a capacitive sensor, an optical sensor, or a thermal sensor. The plasma detecting means 85 can be disposed in or on the discharge chamber.

The plasma detecting means 85 can be designed as one or several measuring means for electric variables and/or power variables. Electric variables such as current and/or voltage can, e.g., be measured at the output of the RF power generators 31-46 or at the electrodes of the electrode pairs 63-78. Electric variables can be measured in the feed lines to the electrodes of the electrode pairs 63-78 or in optionally provided adjustment members or coupling members.

The power supplied to the plasma process or the power reflected by the plasma process can be measured. The harmonics of the current and/or the voltage can be measured or detected to obtain information about the plasma state. Information about the presence of an auxiliary plasma can also be obtained from the measurement of the phase difference between the current and the voltage or from the time behavior of a variable, such as, e.g., the voltage or the current.

The RF power generators 19-22 or 31-46 can be driven based on whether or not an auxiliary plasma is present in the discharge chamber for igniting the main plasma. If the plasma detecting means 85 detects that no auxiliary plasma is left, the RF power generators 31-46 can be driven to perform a "hard ignition," i.e., to provide a high voltage, since a plasma must initially be generated in the discharge chamber. Alternatively, the high voltage can be generated by changing the load matching to "hard ignition" or by changing the RF power frequency. If the plasma detecting means 85 detects that an auxiliary plasma is still present in the discharge chamber, then the RF power generators 31-46 can be driven to perform a "soft ignition," i.e., to provide a lower voltage and power. The main plasma power can be obtained by a fast (closed-loop) power control, thereby preventing overswinging of the RF power beyond a desired power.

In some implementations, an RF power is predetermined below which the auxiliary plasma extinguishes. The auxiliary plasma can be prevented from being extinguished through correspondingly driving at least a second number of RF power generators that is smaller than a first number of RF power generators that are used to generate the main plasma. The RF power depends to a large extent on the vacuum plasma process to be used. When the process and the RF power required for the auxiliary plasma of this process are known, the RF power can, e.g., be manually preset.

In some implementations, the vacuum plasma process system 30 includes a storage means 90 that stores a plasma power value, below which the auxiliary plasma extinguishes. The storage means 90 can be included in the central control 82 (as shown) or can be separate from and coupled to the central control 82.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of operating a vacuum plasma process system including a plasma discharge chamber, the method comprising:
    monitoring a state of the plasma present in the discharge chamber using a plasma detector;
    determining that a main plasma is required, and in response, generating the main plasma in the discharge chamber with a first number of RF power generators while operating the vacuum plasma process system in a first operating state; then
    determining that the main plasma is no longer required, and in response, generating an auxiliary plasma in the discharge chamber with a second number of RF power generators while operating the vacuum plasma process system in a second operating state, different from the first operating state;
    wherein the second number is smaller than the first number.

2. The method of claim 1, wherein each RF power generator is associated with an electrode or an electrode pair.

3. The method of claim 1, wherein all RF power generators are used to generate the main plasma.

4. The method of claim 1, wherein monitoring the plasma state includes determining whether the auxiliary plasma is present.

5. The method of claim 1, wherein generating the main plasma includes driving the RF power generators to provide a voltage which is based on whether the auxiliary plasma is present.

6. The method of claim 1, further comprising predetermining an RF power below which the auxiliary plasma extinguishes.

7. The method of claim 1, further comprising detecting and storing an RF power at which the plasma extinguishes.

8. The method of claim 1, further comprising controlling the generated main plasma power, the generated auxiliary plasma power, or a combination thereof in a closed-loop manner.

9. The method of claim 1, further comprising driving the RF power generators.

10. The method of claim 9, wherein driving the RF power generators includes driving the RF power generators in parallel with a central control.

11. The method of claim 1, wherein the second number of RF power generators is a subset of the first number of RF power generators.

12. The method of claim 1, wherein generating the main plasma in the discharge chamber with a first number of RF power generators while operating the vacuum plasma process system in a first operating state includes generating the main plasma while the vacuum plasma process system operates at a first power level.

13. The method of claim 12, wherein generating the auxiliary plasma in the discharge chamber with a second number of RF power generators while operating the vacuum plasma process system in a second operating state includes generating the auxiliary plasma while the vacuum plasma process system operates at a second power level.

14. The method of claim 13, wherein the second power level is less than the first power level.

15. A vacuum plasma process system comprising:
    a discharge chamber;
    a plurality of RF power generators for generating a main plasma while operating the vacuum plasma process system in a first operating state and an auxiliary plasma while operating the vacuum plasma process system in a second operating state, different from the first operating state, wherein:
        at least some of the RF power generators are provided having associated electrodes or electrode pairs, and
        a first number of the RF power generators are operated for generating the main plasma, a second number of the RF power generators are operated to generate the auxiliary plasma, and
        the second number is smaller than the first number;
    a plasma detector for monitoring a state of the plasma present in the discharge chamber; and
    a control system coupled to the RF power generators, wherein the control system is configured to:
        determine that the main plasma is required, and in response, drive the first number of the RF power generators to generate the main plasma; and
        determine that the main plasma is no longer required, and in response, drive the second number of the RF power generators to generate the auxiliary plasma.

16. The vacuum plasma process system of claim 15, wherein each RF power generator is associated with an electrode or an electrode pair.

17. The vacuum plasma process system of claim 15, wherein the plasma detector is designed as a Langmuir probe, a capacitive sensor, an optical sensor, or a thermal sensor.

18. The vacuum plasma process system of claim 15, wherein the plasma detector is designed as one or more measuring means for electric variables, power variables, or both electric and power variables.

19. The vacuum plasma process system of claim 15, further comprising impedance matching members that connect the RF power generators to the electrodes or electrode pairs.

20. The vacuum plasma process system of claim 15, wherein the RF power generators of the second number are operated based on a plasma power value, below which the auxiliary plasma extinguishes.

21. A vacuum plasma process system comprising:
a discharge chamber;
a plasma detector for monitoring a state of the plasma present in the discharge chamber; and
a set of RF power generators operable to:
maintain an auxiliary plasma in the discharge chamber while operating in a first operating state; and, responsive to entering a second operating state,
generate a main plasma at a first power level if the auxiliary plasma is determined to be extinguished prior to igniting the main plasma; and
generate the main plasma at a second power level if the auxiliary plasma is determined to be not extinguished prior to igniting the main plasma;
wherein the second power level is less than the first power level.

22. The method of claim 1, wherein the plasma detector is designed as a Langmuir probe, a capacitive sensor, an optical sensor, or a thermal sensor.

23. The method of claim 1, wherein the plasma detector is designed as one or more measuring means for electric variables, power variables, or both electric and power variables.

24. The vacuum plasma process system of claim 21, wherein the plasma detector is designed as a Langmuir probe, a capacitive sensor, an optical sensor, or a thermal sensor.

25. The vacuum plasma process system of claim 21, wherein the plasma detector is designed as one or more measuring means for electric variables, power variables, or both electric and power variables.

* * * * *